July 2, 1929.   H. R. HUMPHREY   1,718,961
COOKING STOVE
Filed Jan. 2, 1926    4 Sheets-Sheet 3
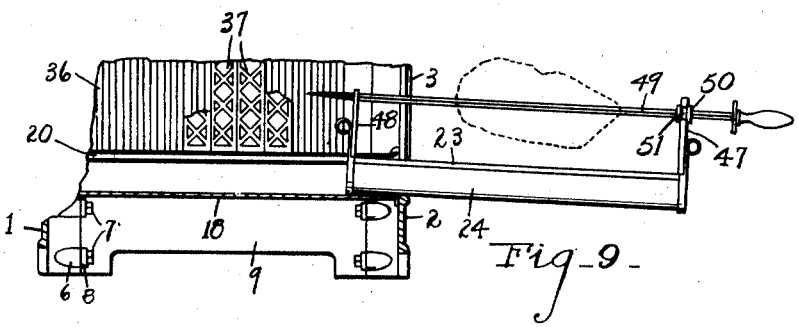
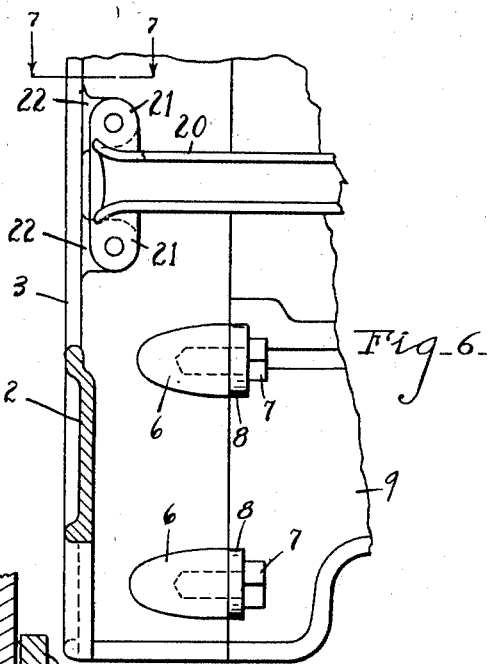
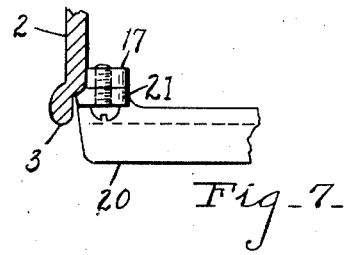
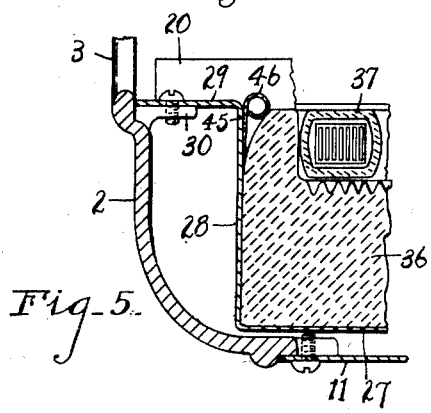
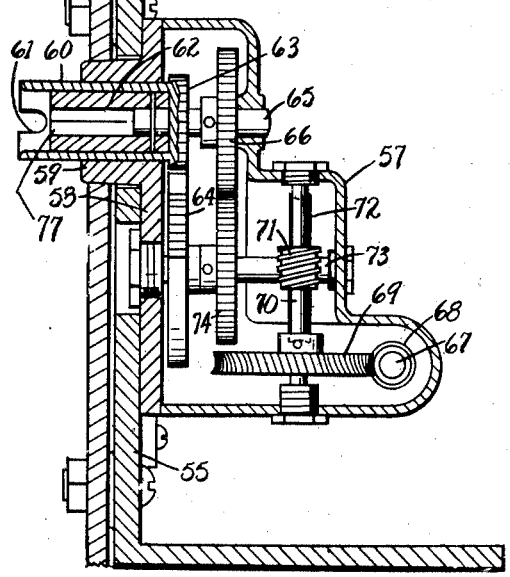
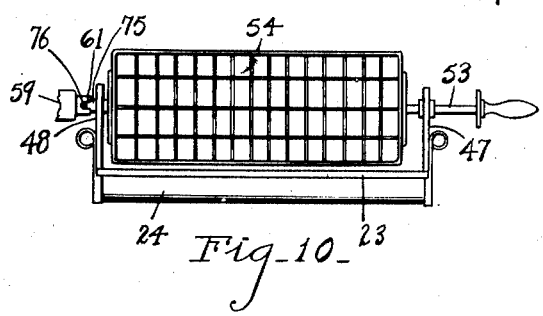
INVENTOR
Hubert R. Humphrey
BY Chappell & Earl
ATTORNEYS

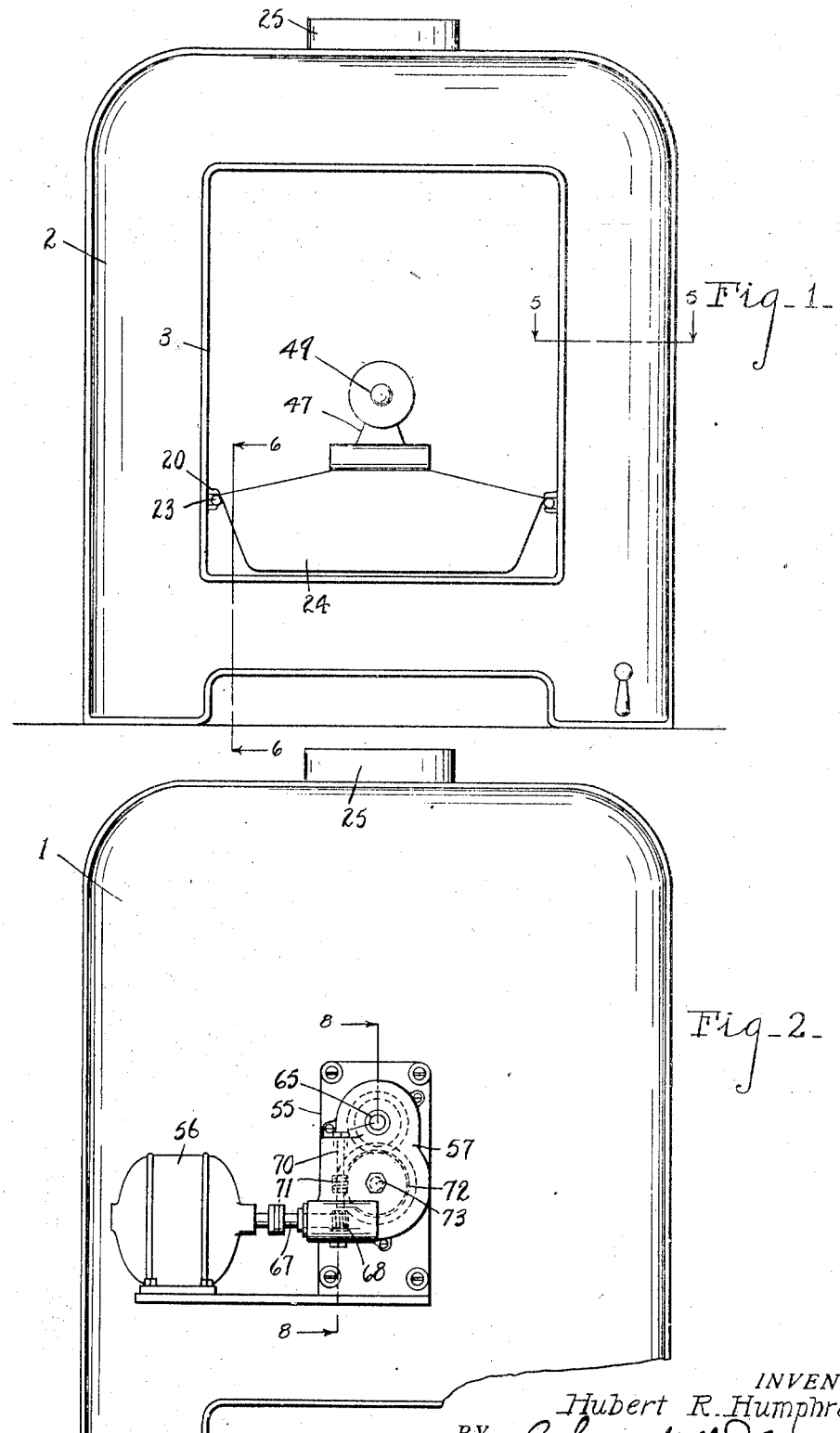

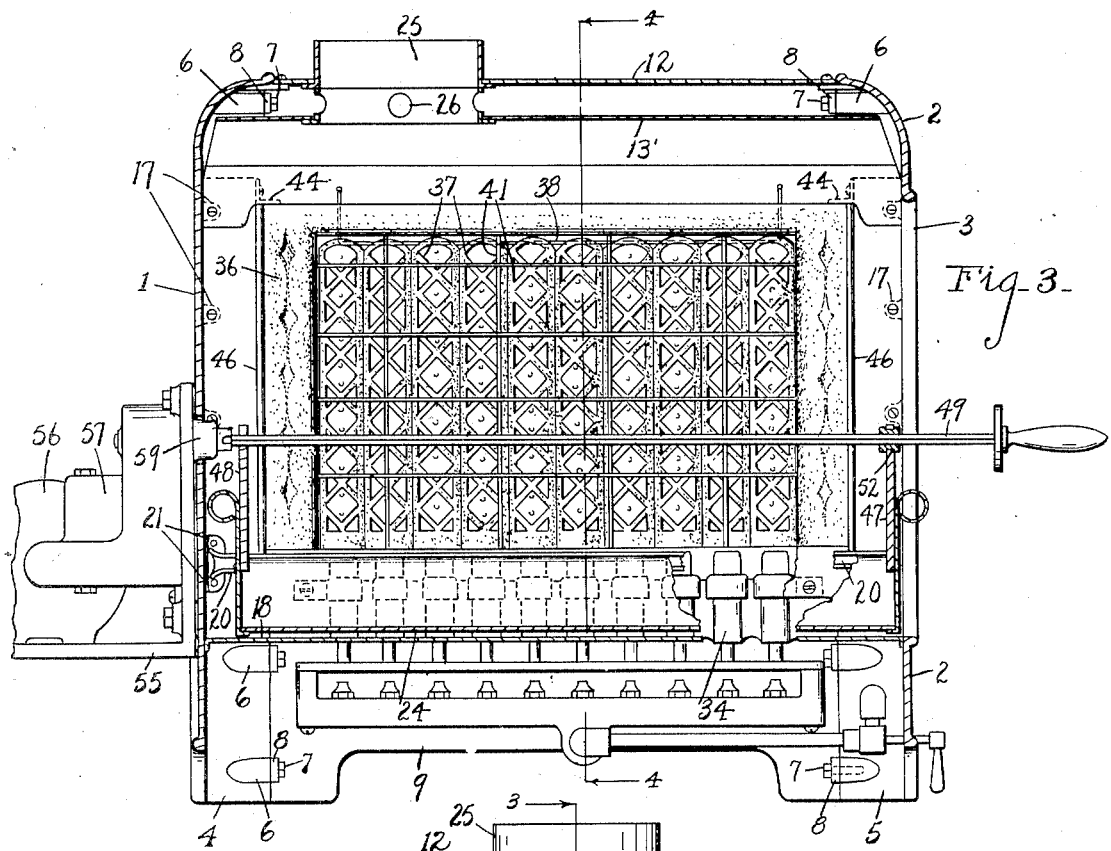

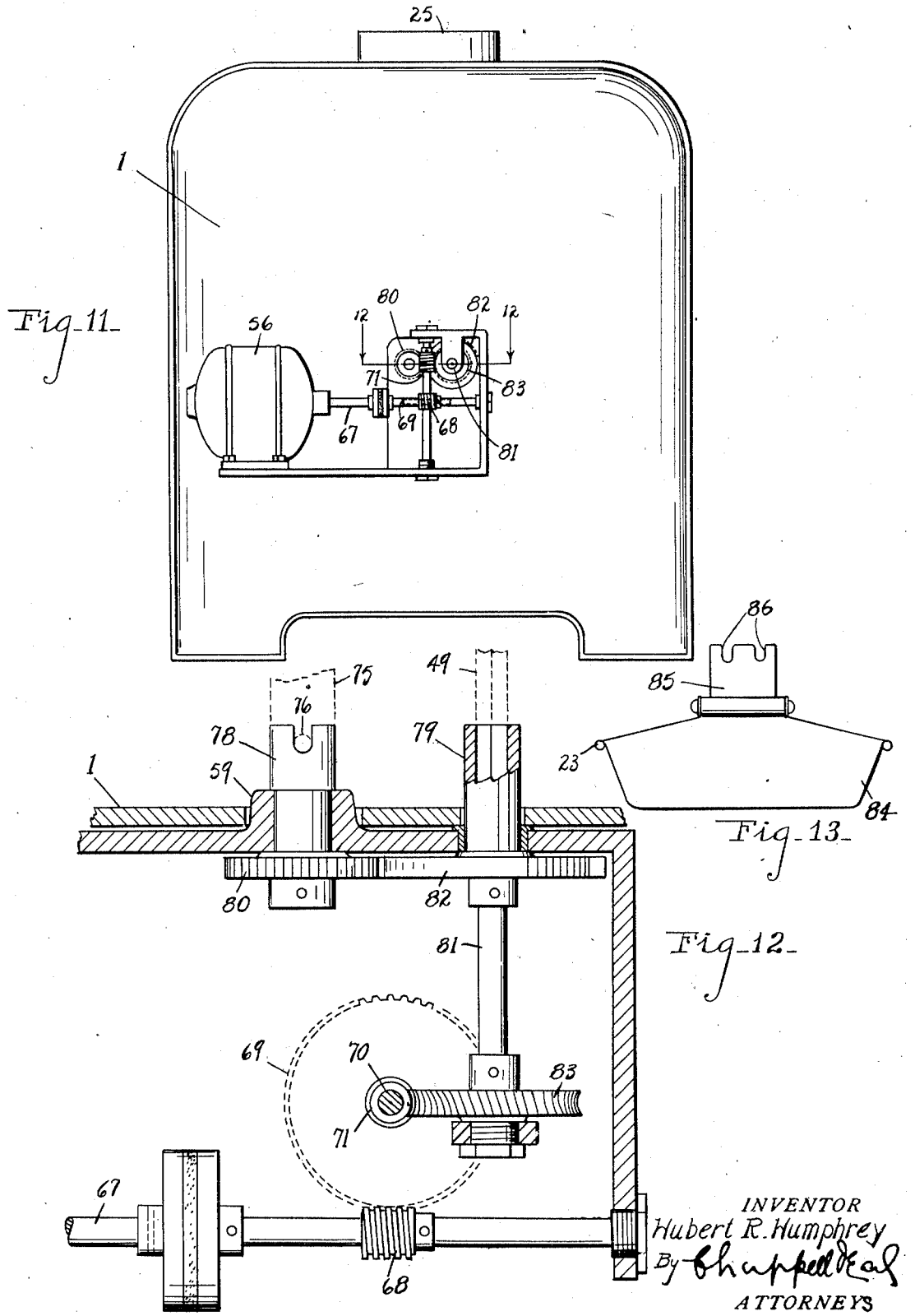

Patented July 2, 1929.

1,718,961

UNITED STATES PATENT OFFICE.

HUBERT R. HUMPHREY, OF KALAMAZOO, MICHIGAN, ASSIGNOR TO GENERAL GAS LIGHT COMPANY, OF KALAMAZOO, MICHIGAN.

COOKING STOVE.

Application filed January 2, 1926. Serial No. 78,845.

The main objects of this invention are:

First, to provide an improved gas or vapor burning cooking stove which is highly efficient for broiling, roasting and like purposes and requires a minimum of attention on the part of the operator.

Second, to provide an improved cooking stove employing grills, spits or the like in which the grill or spit may be easily engaged with a driving means.

Third, to provide in a structure of the class described an improved driving means.

Objects pertaining to details and economies of construction and operation of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a front view of a stove structure embodying the features of my invention.

Fig. 2 is a rear view thereof, a portion of the casing being broken away.

Fig. 3 is a vertical longitudinal section on a line corresponding to line 3—3 of Fig. 4, the parts being shown in full lines for convenience in illustration.

Fig. 4 is a transverses section on a line corresponding to line 4—4 of Fig. 3.

Fig. 5 is a detail horizontal section on a line corresponding to line 5—5 of Fig. 1 showing details of the heating unit.

Fig. 6 is an enlarged detail section on a line corresponding to line 6—6 of Fig. 1 showing structural details of the casing and the pan supporting ways.

Fig. 7 is a detail section on a line corresponding to line 7—7 of Fig. 6.

Fig. 8 is a detail vertical section on a line corresponding to broken line 8—8 of Fig. 2 showing details of the driving means.

Fig. 9 is a detail vertical section corresponding to that of Fig. 3 with the pan in retracted position, an object such as a roast of meat being indicated by dotted lines upon the spit.

Fig. 10 is a detail view showing a grid or grill supported in the pan and in engagement with the driving chuck.

Fig. 11 is a rear view of a slightly modified form of driving means.

Fig. 12 is an enlarged detail section on a line corresponding to line 12—12 of Fig. 11.

Fig. 13 is an end view of the drip pan adapted for the modification of Figs. 11 and 12.

In the embodiment of my invention illustrated I provide an outer casing comprising a rear wall and frame member 1 and a front member 2 having a door opening 3 therein. These wall members are formed as castings and have inwardly projecting flange portions 4 and 5 at their edges. These flange portions have internal bosses 6 which are engaged by the screws 7 arranged through ears 8 on the bottom horizontal pieces 9 and the top horizontal pieces 10. The side panels 11 and the top panel 12 complement these horizontal members in completing the sides of the casing.

Within the casing is an oven or cooking chamber 13 having an opening 14 at one side. This cooking chamber is, in the structure illustrated, formed by a top and side wall member 13' mounted on the end members of the casing which are provided with supporting lugs 17 therefor. These wall members are mounted in spaced relation to the top and sides of the casing providing a circulating space 15 at one side and a space 16 at the other adapted to receive the heating unit.

A pan-like bottom 18 is secured to the depending lugs 19 on the channel ways or rails 20. These ways are disposed in an opposed relation and terminate in laterally turned ears 21 secured to ears 22 on the front and rear members of the casing. The ways 20 are adapted to receive the bead-like slides 23 on the pan 24 thereby slidably supporting the pan so that it may be pushed into the cooking chamber as shown in Fig. 9.

A vent flue 25 is provided for this cooking chamber and is disposed through the top of the casing. This flue has an opening 26 therein opening to the space between the cooking chamber and casing.

The heating unit is arranged within the casing at the side of the cooking chamber facing the opening 14. This heating unit is provided with a casing comprising a sheet metal back wall 27 having integral end walls 28 terminating at their forward edges in laterally turned flanges 29 lapping upon and secured to the inwardly projecting lugs 30 on the front and rear casing members 1 and 2.

Within this casing and adjacent the bottom thereof is a supporting plate 31 which is secured by the bolts 32 to the back and side walls of the heater unit casing, this constituting a cross reinforcing member therefor. The supporting plate 31 has downwardly projecting lugs 33 at its front edge to which the burner 34 is secured, this burner having a plurality of tips alined with the openings 35 in the supporting plate.

The fireback 36 of earthy material is mounted on the supporting plate at the rear of these openings and tubular foraminated radiating elements 37 are arranged in front of the fireback and above the openings.

The radiating elements are retained in position by means of the rod 38 having upturned ends arranged through the top flange 39 of the fireback, the rod engaging notches 40 in the upper ends of the radiating elements. A grid 41 is provided to protect the radiating elements.

Retaining members 44 are secured to the end walls of the heating unit casing to engage the top of the fireback. Filler members 45 having bead-like rolls 46 at their front edges are inserted between the ends of the fireback and the end walls of the heating unit casing to provide a finish and close the joint between these parts.

The pan 24 is provided with spit or grill supporting uprights 47 and 48 at the ends thereof. The spit 49 is provided with a bearing member 50 having an annular groove 51 therein and adapted to be detachably engaged in a bearing 52 in the front supporting standard 47. The spindle 53 of the grill or grid 54 also has a bearing 50 adapted for detachable engagement with the support 47.

On the outer side of the member 1 of the casing I mount a bracket 55 for supporting the motor 56 and the gear box 57. The inner wall 58 of this gear box has a bearing 59 projecting through the rear casing member 1, see Fig. 8. Within this bearing is the sleeve-like driving chuck 60 having slots 61 in its inner end. Within this sleeve-like chuck 60 is a second chuck 62, these chucks being capable of independent rotation.

The chuck 60 is driven with a step by step movement and is provided with a pinion 63 within the gear box meshing with the mutilated or intermittent gear 64. The chuck 62 has a spindle 65 projecting into the gear box through the gear 63 and provided with a pinion 66. The motor shaft 67 projects into the gear box and has a worm 68 thereon meshing with a worm 69 on the shaft 70. The shaft 70 has a worm 71 meshing with a worm 72 on the shaft 73 carrying the intermittent gear and also a gear 74 meshing with the pinion 66.

A speed reducing drive is thus provided for the motor to the chucks, the inner chuck 62 being driven with a continuous motion while the outer chuck 60 is driven with an intermittent motion.

The grill or grid 54 has a spindle 75 at its rear end adapted to engage with a cross pin 76 adapted to engage the slots 61 of the driving chuck 60 while the driving chuck 62 has a non-circular socket 77 adapted to receive the non-circular end of the spit.

The supporting standards on the pan support the grid spindle or the spit so that when the pan is pushed into the cooking chamber the implement, whichever it may be, is guided into driving engagement with the driving chucks. It may, however, be partially retracted so that it is free to be turned by hand which is desirable for purposes of inspecting the object being cooked, or when used for toasting or the like, as the interval of time required before the article should be turned would be less than the time of a single rotation of the chuck 60. This chuck is timed so that the grill is supported for a suitable interval with one side facing the heating unit and is then rotated to present the other side.

In the modification shown in Figs. 11, 12 and 13 separate chucks 78 and 79 are provided. The chuck 78 is adapted to receive the gear spindle 75 while the chuck 79 is adapted to receive the spit 49. The chuck 78 is accordingly provided with a pinion 80 while the shaft or spindle 81 of the chuck 79 carries an intermittent or mutilated gear 82 coacting with the pinion 80.

In this arrangement the worm 71 meshes with a gear 83 on the shaft 81 corresponding to the gear 72 of the structure described.

The pan 84 of this embodiment has uprights 85 at its ends provided with a pair of recesses 86 adapted to receive the implements to guide them to proper relation to the chucks and to support them when the pan is withdrawn.

Stoves embodying my improvements are highly efficient for cooking, especially for the cooking of meat which may be entirely and evenly cooked in a comparatively short time. The radiant heat of the heating unit is highly efficient for this purpose. Further, the cooking may be done with a minimum of effort and care on the part of the operator and the article being cooked is easily inspected and open to the air without any substantial loss of heat. The cooking temperature is very quickly reached after the lighting of the burner.

I have illustrated and described my improvements in embodiments which I have found highly practical. I have not attempted to illustrate or describe certain modifications and adaptations which I contemplate as I believe the disclosure made will enable those skilled in the art to embody or adapt my improvements as may be desired.

Having thus described my invention what I claim as new and desire to secure by Letters Patent is:

1. In a structure of the class described, the combination of a casing, a cooking chamber within said casing having a side opening, a heating unit casing comprising back and end walls, the end walls having out-turned flanges at their forward edges secured to said casing, a supporting plate disposed within and secured to the back and end walls of said heating unit casing, said supporting plate having depending lugs at the front thereof, a burner secured to said lugs, and radiating elements disposed on said supporting plate.

2. In a structure of the class described, the combination of a casing, a cooking chamber within said casing having a side opening, a heating unit casing comprising back and end walls, the end walls having out-turned flanges at their forward edges secured to said casing, a supporting plate disposed within and secured to the back and end walls of said heating unit casing, a burner suspended from said plate, and radiating elements disposed on said supporting plate.

3. In a structure of the class described, the combination of a casing, a cooking chamber within said casing having a side opening, a heating unit casing comprising back and end walls, the end walls having out-turned flanges at their forward edges secured to said casing, a supporting plate disposed within and secured to the back and end walls of said heating unit casing, a burner suspended from said plate, a fireback arranged on said supporting plate and having a forwardly projecting flange at its upper end, the edge of the flange being disposed adjacent to the upper edge of said opening in said cooking chamber, and radiating elements disposed on said supporting plate in front of said fireback.

4. In a structure of the class described, the combination of a casing, a cooking chamber disposed within said casing and having a side opening, a vent flue for said cooking chamber communicating with the space between the casing and cooking chamber, a heating unit casing comprising back and end walls, the end walls having out-turned flanges at their forward edges secured to said casing, a supporting plate disposed within and secured to the back and end walls of said heating unit casing, a burner suspended from said plate, a fireback arranged on said supporting plate and having a forwardly projecting flange at its upper end, the edge of the flange being disposed adjacent to the upper edge of said opening in said cooking chamber, and radiating elements disposed on said supporting plate.

5. In a structure of the class described, the combination of a main casing, a cooking chamber within said casing having a side opening, a heating unit casing comprising back and end walls, the end walls having out-turned flanges at their forward edges secured to said casing, a supporting plate mounted within said casing, a burner suspended from said supporting plate, and radiating elements mounted on said supporting plate in opposed relation to said opening in said cooking chamber and in operative relation to said burner.

6. In a structure of the class described, the combination of a main casing, a cooking chamber within said casing having a side opening, a heating unit comprising a casing mounted within said main casing, a supporting plate mounted within said heating unit casing, a burner disposed below said supporting plate, a fireback arranged on said supporting plate, radiating elements disposed on said supporting plate in front of said fireback and facing said opening in said cooking chamber, an implement driving element, and a pan slidable within said cooking chamber and provided with implement supports adapted to facilitate the engagement of an implement with said driving element and to rotatably support the same when disengaged therefrom.

7. In a structure of the class described, the combination of a main casing, a cooking chamber within said casing having a side opening, a heating unit comprising a casing mounted within and supported by said main casing, a supporting plate mounted within said heating unit casing, a burner disposed below said supporting plate, a fireback arranged on said supporting plate, and radiating elements disposed on said supporting plate in front of said fireback and facing said opening in said cooking chamber.

8. In a cooking stove, the combination of a casing, a cooking chamber within said casing having a side opening, a radiant heat heating unit disposed within said casing in opposed relation to said side opening of said cooking chamber, a pair of implement driving elements, one of which is driven with an intermittent movement and the other with a continuous movement, and an implement supporting means slidable within said cooking chamber and adapted to rotatably support implements within the cooking chamber and to facilitate the engagement thereof with said driving elements.

9. In a structure of the class described, the combination of a cooking chamber provided with heating means, a plurality of concentrically disposed implement driving elements disposed at the inner end of the chamber, means for driving one of said elements with an intermittent motion and the other with a continuous movement, and a pan slidable within said chamber and provided with implement supports at its ends, the outer support being adapted to rotatably support the outer end of an implement while engaged with one of said driving elements.

10. In a cooking stove, the combination of a cooking chamber, a heating unit therefor, implement driving elements, one of which is driven with an intermittent movement and the other with a continuous movement, and an implement supporting means adapted to facilitate the engagement thereof with said driving elements.

11. In a structure of the class described, the combination of a cooking chamber provided with heating means, concentrically disposed implement driving elements disposed at the inner end of the chamber, means for driving one of said elements with an intermittent motion and the other with a continuous motion, and implement supporting means facilitating the engagement of an implement with said driving elements.

12. In a structure of the class described, the combination of a cooking chamber provided with heating means, concentrically disposed implement driving elements, means for driving said elements at different speeds, and implement supporting means facilitating the engagement of an implement with said driving elements and adapted to rotatably support one end of an implement while engaged with one of said driving elements.

13. In a structure of the class described, the combination of a cooking chamber provided with heating means, concentrically disposed implement driving elements, means for driving said elements at different speeds, and implement supporting means adapted to rotatably support one end of an implement while engaged with one of said driving elements.

14. In an apparatus of the class described, the combination with a chamber provided with heating means, a spit and a grill provided with spindles, of a sleeve-like spindle driving chuck adapted to receive the grill spindle, a spit driving chuck within said grill driving chuck adapted to receive the end of the spit, means for driving said chucks at different speeds, the inner chuck being driven with a continuous movement while the outer chuck is driven with an intermittent motion, and means for selectively supporting either said grill or said spit and guiding them into engagement with their respective chucks or rotatably supporting them independently thereof.

15. In an apparatus of the class described, the combination with a chamber provided with heating means, a spit and a grill provided with spindles, of a sleeve-like spindle driving chuck adapted to receive the grill spindle, a spit driving chuck within said grill driving chuck adapted to receive the end of the spit, means for driving said chucks at different speeds, and means for selectively supporting either said grill or said spit and guiding them into engagement with their respective chucks, or rotatably supporting them independently thereof.

16. In a cooking stove, the combination of a cooking chamber, a plurality of implements, implement supporting means adapted to rotatably support implements within said cooking chamber, implement driving elements provided with chucks of different character, the chucks and implements being conformed so that they must be paired, and means for driving said driving elements at different speeds.

In witness whereof I have hereunto set my hand.

HUBERT R. HUMPHREY.